United States Patent
Wesner

(10) Patent No.: US 11,637,336 B2
(45) Date of Patent: Apr. 25, 2023

(54) DEVICE FOR COOLING A BATTERY

(71) Applicant: Mahle International GmbH, Stuttgart (DE)

(72) Inventor: Markus Wesner, Stuttgart (DE)

(73) Assignee: Mahle International GmbH

( * ) Notice: Subject to any disclaimer, the term of this patent is extended or adjusted under 35 U.S.C. 154(b) by 353 days.

(21) Appl. No.: 16/851,059

(22) Filed: Apr. 16, 2020

(65) Prior Publication Data

US 2020/0335838 A1 Oct. 22, 2020

(30) Foreign Application Priority Data

Apr. 17, 2019 (DE) ...................... 10 2019 205 575.3

(51) Int. Cl.
| | |
|---|---|
| *H01M 10/625* | (2014.01) |
| *H01M 10/6569* | (2014.01) |
| *H01M 10/6568* | (2014.01) |
| *H01M 10/613* | (2014.01) |
| *H01M 10/663* | (2014.01) |

(52) U.S. Cl.
CPC ....... *H01M 10/625* (2015.04); *H01M 10/613* (2015.04); *H01M 10/6568* (2015.04); *H01M 10/6569* (2015.04); *H01M 10/663* (2015.04); *Y02E 60/10* (2013.01)

(58) Field of Classification Search
CPC ............. H01M 10/613; H01M 10/625; H01M 10/6568; H01M 10/6569; H01M 10/663; Y02E 60/10
See application file for complete search history.

(56) References Cited

U.S. PATENT DOCUMENTS

| | | | |
|---|---|---|---|
| 5,904,292 A | 5/1999 | McIntosh | |
| 6,297,505 B1 * | 10/2001 | Frandsen | G01N 21/3577 250/436 |
| 2002/0184908 A1 * | 12/2002 | Brotz | B60H 1/143 62/198 |
| 2004/0050544 A1 | 3/2004 | Hohl et al. | |
| 2009/0325013 A1 * | 12/2009 | Watanabe | H01M 8/04365 429/411 |

(Continued)

FOREIGN PATENT DOCUMENTS

| | | |
|---|---|---|
| CN | 207690970 U | 8/2018 |
| CN | 108899612 A | 11/2018 |
| DE | 10134678 A1 | 2/2003 |

(Continued)

OTHER PUBLICATIONS

English abstract for CN-207690970.

(Continued)

*Primary Examiner* — Lingwen R Zeng
(74) *Attorney, Agent, or Firm* — Fishman Stewart PLLC

(57) ABSTRACT

A device for temperature-controlling a vehicle battery in an electric or hybrid vehicle may include a coolant circuit, a refrigerant circuit, and a first valve device. The vehicle battery, a coolant cooler, a coolant pump, and a chiller may be arranged in the coolant circuit. The chiller, a compressor, a condenser, and an evaporator may be arranged in the refrigerant circuit. The first valve device may be arranged indirectly on the chiller. A coolant flow may be dividable between the chiller and the coolant cooler via the first valve device.

19 Claims, 3 Drawing Sheets

(56) References Cited

U.S. PATENT DOCUMENTS

2012/0291987 A1* 11/2012 Himmer .................. F28D 9/005
                                                                                                              165/140
2016/0215664 A1    7/2016  Boyer et al.

FOREIGN PATENT DOCUMENTS

| DE | 697 30 613 T2 | 9/2005 |
| DE | 10 2008 017 113 A1 | 10/2009 |
| DE | 10 2009 054 186 A1 | 5/2011 |
| DE | 10 2011 080 208 A1 | 2/2013 |

OTHER PUBLICATIONS

English abstract for CN-108899612.
English abstract for DE-10 2008 017 113.
English abstract for DE-697 30 613.
English abstract for DE-10 2011 080 208.

* cited by examiner

DEVICE FOR COOLING A BATTERY

CROSS-REFERENCE TO RELATED APPLICATIONS

This application claims priority to German Patent Application No. DE 10 2019 205 575.3, filed on Apr. 17, 2019, the contents of which is hereby incorporated by reference in its entirety.

TECHNICAL FIELD

The invention relates to a device for temperature-controlling a vehicle battery in a motor vehicle having a coolant circuit and to a coolant circuit. The invention additionally relates to an electric or hybrid vehicle having such a device.

BACKGROUND

From DE 10 2008 017 113 A1 a generic device for cooling a vehicle battery in a motor vehicle is known, having a coolant circuit, in which the vehicle battery, a coolant cooler, a coolant pump and a chiller are arranged. The chiller is additionally incorporated in a refrigerant circuit, in which additionally a compressor, a condenser and an evaporator are arranged. The incorporation of the coolant circuit in the refrigerant circuit via the chiller however is comparatively complicated.

From DE 10 2009 054 186 A1 a system for heating or cooling a battery of a motor vehicle interior of a motor vehicle is known, comprising a coolant circuit, which is thermally coupled to the battery, in particular with a battery heat exchanger, and a refrigerant circuit having a condenser, a compressor and a first evaporator for cooling the motor vehicle interior and a second evaporator for cooling the battery, in which the second evaporator is thermally coupled to the coolant circuit with an evaporator heat exchanger. The second evaporator thus constitutes a chiller. In order to be able to utilize the waste heat of the battery with a least technical expenditure possible for the heating of the motor vehicle interior at the same time, the evaporator heat exchanger, i.e. the chiller, is provided with at least one means for transmitting heat from the chiller to the motor vehicle interior.

From DE 10 2011 080 208 A1 a heat exchanger system for a vehicle is known, which comprises a distributor for dividing a coolant flow into a first coolant flow and a second coolant flow, a charge air cooler for an engine that is coolable by the first coolant flow, a condenser that is coolable by the second coolant flow and a regulator for regulating a mass flow of the first coolant flow through the charge air cooler. This is to simplify operating a heat exchanger system.

From DE 697 30 613 T2 a modulating flow medium control device for a heating and cooling system based on a flow medium for a measurement environment is known.

From US 2016/0215664 A1 a thermal management system having an oil heater, a valve and a pressure relief valve is known.

This advantages in the device for cooling a vehicle battery in a motor vehicle described first is that for realizing the device comparatively many lines and T-pieces are necessary, which in turn require a major installation and are thus expensive.

Generally, so-called chillers are often employed as heat exchangers in order to transfer a waste heat introduced into the coolant cooling plates from charge/discharge processes of the battery cells into the refrigerant circuit of the motor vehicle. This is necessary in particular with higher ambient temperatures and with a quick charging operation. Generally, three different types for cooling a coolant of the battery cooling plates are distinguished: for example, merely a chiller can be employed which represents a heat sink for the coolant, but which merely has a efficiency and because of this is restricted to a use in lower ambient temperatures. It is also conceivable to only cool the coolant of the battery cooling plates or generally of the battery only by way of a low-temperature coolant cooler, so that in this case the heat sink represents the ambient air. Such a cooling however is possible almost exclusively in low end temperatures and thus in cold countries. The third possibility constitutes the most effective one and is a combination of the two previously described solutions. However, disadvantageous here is a substantial assembly effort and a substantial parts variety, caused by additional lines, T-pieces, change-over valves and connected with this also by an additional and considerable assembly expenditure.

SUMMARY

The present invention therefore deals with the problem of stating an improved or at least an alternative embodiment for a device of the generic type, which makes possible an efficient temperature control of a vehicle battery with reduced constructive expenditure at the same time.

According to the invention, this problem is solved through the subject matter of the independent claim(s). Advantageous embodiments are subject of the dependent claim(s).

The present invention is based on the general idea of arranging a first valve device for dividing a coolant flow between a chiller and a coolant cooler in the chiller or directly on the same, as a result of which a multiplicity of external lines and external T-pieces can be omitted and because of this the assembly expenditure substantially reduced. The device according to the invention for cooling a heat source or for the temperature control for example of a vehicle battery in a motor vehicle comprises a coolant circuit in which the heat source, i.e. for example a vehicle battery, a coolant cooler, a coolant pump and the chiller are arranged. The chiller is additionally incorporated in a refrigerant circuit, in which in addition a compressor, a condenser and an evaporator are arranged. By integrating the first valve device in the chiller or an arrangement of the same directly on the chiller, the number of interfaces can be from previously eight to only four now, wherein addition a previous external T-piece and a multiplicity of external line can be saved. Altogether, a particularly efficient temperature control, in particular cooling of the heat source, i.e. in the present case usually the vehicle battery, can be achieved together with a low installation space requirement, a low parts variety and thus also a low assembly expenditure and low manufacturing costs.

In the present application, the term "vehicle battery" is to generally also subsume a "heat source" and vice versa.

In a further advantageous embodiment of the solution according to the invention, the first valve device comprises a battery-side coolant inlet, a battery-side coolant outlet, a coolant cooler side coolant inlet, a coolant cooler side coolant outlet, a chiller-side cooler inlet and a chiller-side coolant outlet. By means of such a first valve device, a coolant flow temperature-controlling, in particular cooling the vehicle battery/heat source can be comparatively easily and almost randomly divided between the chiller and the coolant cooler as a result of which a temperature control/cooling of the heat source that is efficient and in particular also suitable for the requirement is made possible. Such a first valve device can be arranged for example in a housing of the chiller and thereby be integrated in the chiller, or be fitted onto the chiller on the outside as a cost-effective attachment part. In particular in the version as attachment part there is the major advantage that in the case of a defective first valve device a simple and thus cost-effective replacement is possible.

In an advantageous further development of the solution according to the invention, the first valve device comprises a control piston which in a first position conducts the coolant flow exclusively via the vehicle battery/heat source and the coolant cooler and thus utilizes the coolant cooler for cooling or generally temperature-controlling, i.e. in particular also for heating the vehicle battery/heat source. For cooler vehicle/battery heat source, for example during a quick charging of a heat source designed as vehicle battery in an electric or hybrid vehicle, this can however take place probably only in low ambient temperatures. In basic in position of the control piston, the same conducts the coolant flow exclusively via the heat source, for example the vehicle battery, and the chiller. This thus constitutes a state in which the temperature control effect, i.e. for example the cooling capacity of the chiller is sufficient. In a random intermediate position of the control piston, the same conducts the coolant flow via the vehicle battery/heat source and proportionately via the chiller and the coolant cooler, as a result of which the setpoint temperature desired at the heat source or the vehicle battery can be comparatively easily adjusted.

Practically, a second valve device is provided in the refrigerant circuit upstream of the chiller, via which a refrigerant flow flowing through the chiller is controllable. By way of this second valve device, refrigerant flowing through the chiller is adjustable or regulatable, as a result of which the output provided for cooling vehicle battery/heat source can likewise be influenced.

Practically, the first or the second valve device is designed so as to be electrically controllable or as thermostat valve. An electrically controllable valve device offers the major advantage that via the same the position of the valve device can be influenced, for example as a function of operating states or motor characteristics. If the first or the second valve device is designed for example as a thermostat valve this offers the major advantage that no additional cabling effort is required and a an automatic, temperature-dependent control of the valve device takes place.

Further, the present invention is based on the general idea of integrating a device described in the preceding paragraphs in an electric or hybrid vehicle and, there, temperature-controlling or cooling a vehicle battery, for example a lithium ion accumulator, by means of the device. By way of this, the previously described advantage can also be transferred to the electric or hybrid vehicle.

Further important features and advantages of the invention are obtained from the subclaims, from the drawings and from the associated figure description by way of the drawings.

It is to be understood that the features mentioned above and still to be explained in the following cannot only be used in the respective combination stated but also in other combinations or by themselves without leaving the scope of the present invention.

Preferred exemplary embodiments of the invention are shown in the drawings and are explained in more detail in the following description, wherein same reference characters relate to same or similar or functionally same components.

BRIEF DESCRIPTION OF THE DRAWINGS

There it shows, in each case schematically.

DETAILED DESCRIPTION

Figure 1:
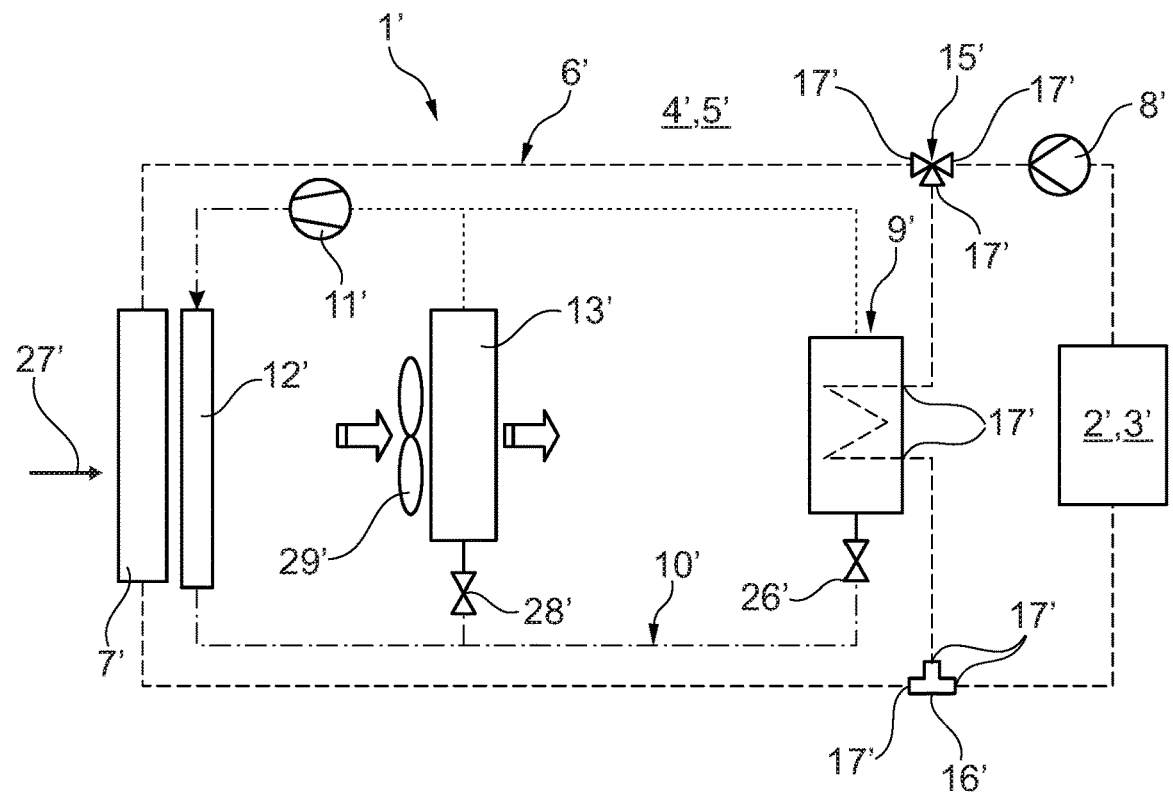
FIG. 1 shows a device for temperature-controlling a heat source/vehicle battery according to the prior art.
Figure 2:
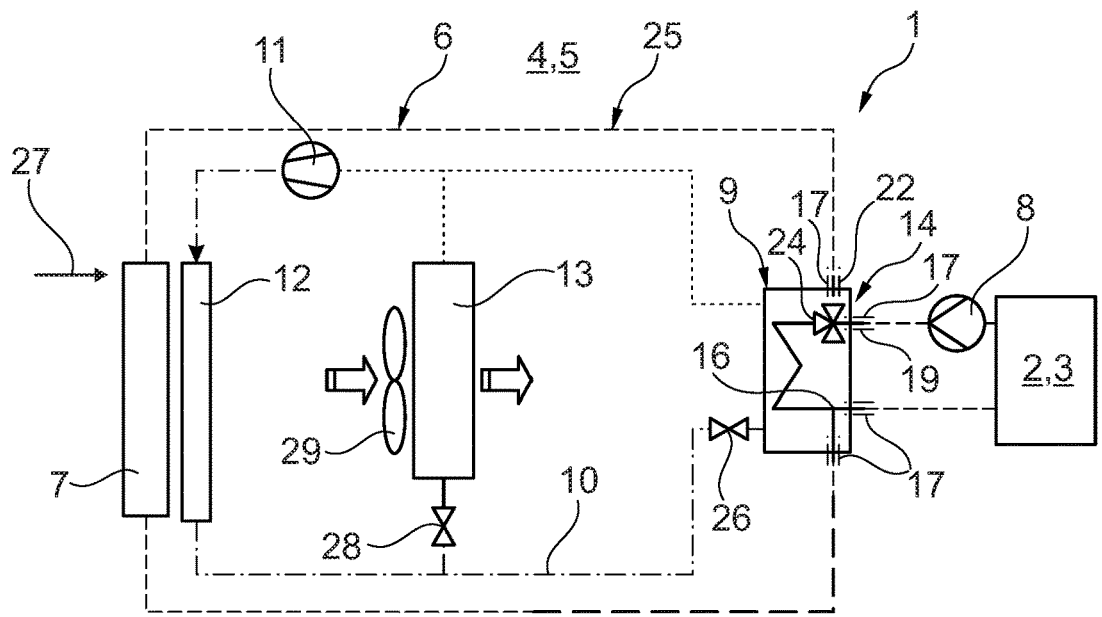
FIG. 2 shows a device according to the invention with first valve device installed in the chiller.
Figure 3:
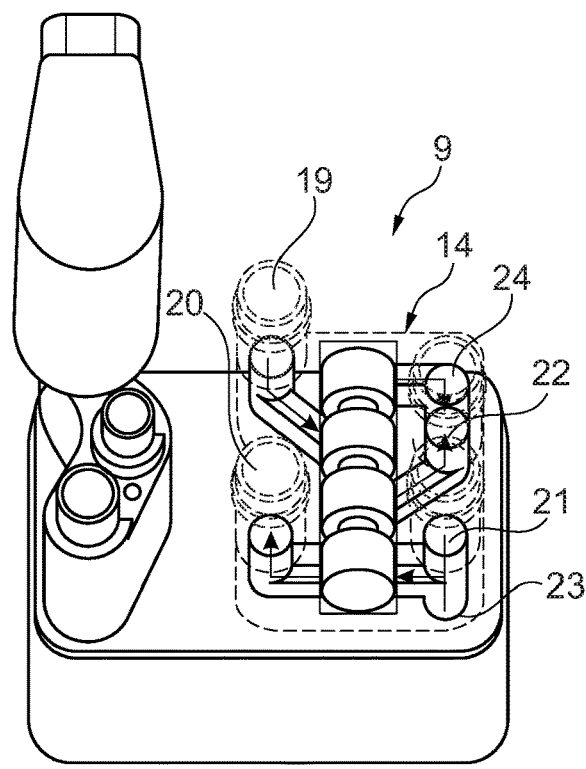
FIG. 3 shows a chiller with an attached first valve device.
Figure 4:
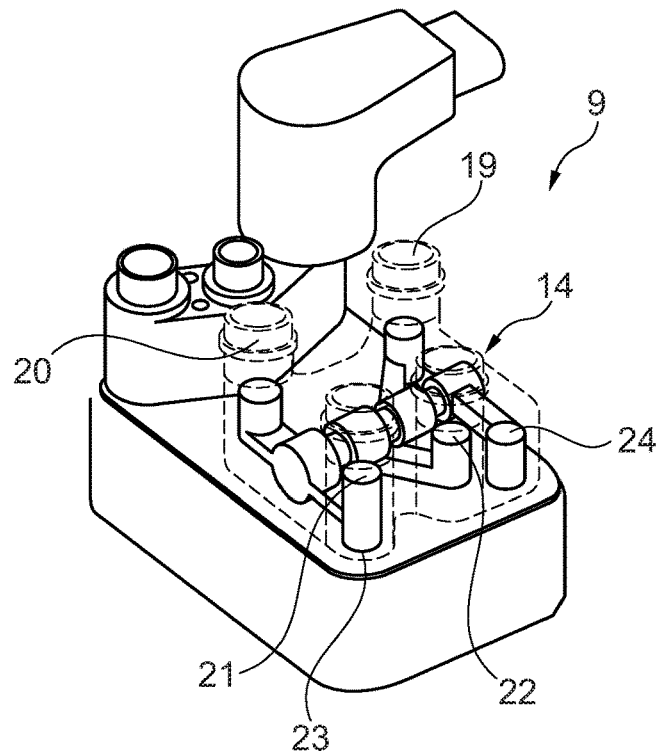
FIG. 4 shows a representation as in FIG. 3, however from another view.
Figure 5:
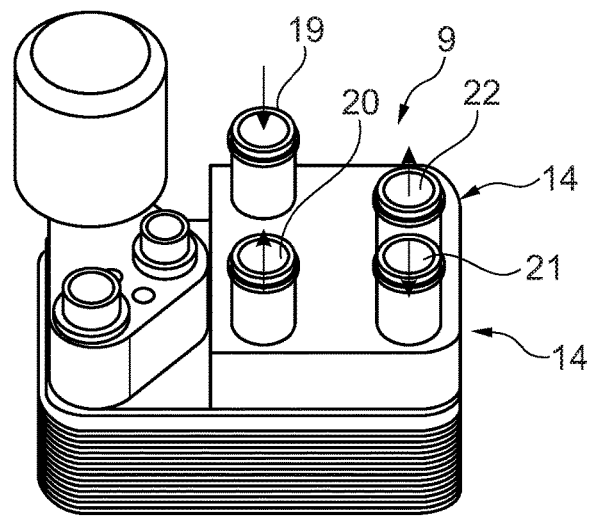
FIG. 5 shows a representation as in FIG. 4, however without transparent representation.

According to FIG. 2, a device 1 according to the invention for the temperature control/cooling of a heat source 2, for example a vehicle battery 3, in a motor vehicle 4, for example in an electric or hybrid vehicle 5, comprises a coolant circuit 6, in which the heat source 2 or the vehicle battery 3, a coolant cooler 7, a coolant pump 8 and a chiller 9 (see also FIGS. 3 to 6) are arranged. Additionally provided is a refrigerant circuit 10, in which the chiller 9, a compressor 11, a condenser 12 and an evaporator 13 are arranged. In the same way, such an arrangement is also provided with the device 1' according to the prior art shown as per FIG. 1, wherein FIG. 1 the reference characters were used analogously but provided with an apostrophe.

According to the invention, a first valve device 14 is now arranged in or directly on the chiller 9, wherein via the first valve device 14 a coolant flow 25 is divisible between the chiller 9 and the coolant cooler 7. This can mean that the coolant flow 25 can be switched over between the chiller 9 and the coolant cooler 7.

Now considering the differences of the device 1' according to the prior art from FIG. 1 and the device 1 according to the invention according to FIG. 2, it is noticeable that with the device 1 according to the invention an external 3/2-way valve 15' can likewise be dispensed with as can an external T-piece 16' and additionally the number of the lines to be installed or generally a line length is significantly shorter. In addition to this, with the device 1' known from the prior art a total of eight connecting points 17' have to be provided while with the device 1 according to the invention as per FIG. 2, merely four connecting points 17 have to be provided now which brings about a halving of the connecting points 17 to be provided and connected with this also a substantial reduction of the assembly costs. Thus, altogether the external T-piece 16', for connecting points 17' as well as several lines can thus be saved altogether with the device 1 according to the invention, which is accompanied by a substantial simplification of the assembly and thus also a substantial cost reduction. In addition to this, merely a single assembly location, namely on the chiller 9, is required instead of altogether 3 assembly locations, namely on the T-piece 16', on the chiller 9' and on the 3/2-way valve 15' previously. In addition to this, a reduction of the required installation space can also be achieved with the device 1 according to the invention, which is of major advantage in particular in modern and confined motor compartments.

In the device 1 according to the invention shown in accordance with FIG. 2 the first valve device 14 is designed as a 3/2-way valve and integrated in the chiller 9 or attached to the same. The T-piece 16 is likewise integrated in the chiller 9. Looking at the first valve device 14 according to FIG. 2, it is noticeable that the same comprises a battery-side coolant inlet 19, a coolant cooler side coolant outlet 22 and a chiller side coolant outlet 24. In this case, the first valve device 14 is designed as a 3/2-way valve. By suitably switching the first device valve 14, a coolant flow 25 is divided between the coolant cooler 7 and the chiller 9. The 3/2-way valve 15' previously arranged externally and the external T-piece 16' are now installation space-savingly arranged in the chiller 9.

Looking at the first valve device 14 according FIGS. 3 to 8 it is noticeable that the same comprises a battery side coolant inlet 19, a battery side coolant outlet 20, a coolant cooler side coolant inlet 21, a coolant cooler side coolant outlet 22, a chiller side coolant inlet 23 and a chiller side coolant outlet 24.

In addition to this, the first valve device 14 according to FIGS. 3 to 8 comprises a control piston 18 (see FIGS. 7 and 8), which in a first position conducts the coolant flow 25 exclusively via the heat source 2, for example the vehicle battery 3, and the coolant cooler 7. The first position of the control piston 18 is shown according to FIG. 8. In the second position of the control piston 18 shown according to FIG. 7, the first valve device 14 conducts the coolant flow 25 exclusively via the heat source 2 and the chiller 9, wherein it is obviously clear that the refrigerant circuit 10 is fluidically separated from the coolant circuit. In an intermediate position of the control piston 18 shown between the two positions according to FIGS. 7 and 8, the same can also conduct the coolant flow 25 via the heat source to and proportionately via the chiller 9 and the coolant cooler 7, as a result of which individual intermediate temperatures are adjustable. The terminology "coolant" should also not exclude that a heating of the heat source 2 or of the vehicle battery 3, for example via the chiller 9 or the coolant cooler 7 can take place by means of the coolant. In the case of a heating of the heat source 2, the same would then not be a heat source but a heat sink.

Looking at the refrigerant circuit 10 according to FIG. 2 further, it is evident that there a second valve device 26 is arranged upstream of the chiller 9, by means of which a refrigerant inflow to the chiller 9 is regulatable. The first or the second valve device 14, 26 can be electrically controllable or designed as a thermostat valve. By way of an electrical controllability it is possible to precisely activate this controllability according to specified data, for example recorded motor data. When the first or second valve device 14, 26 is designed as thermostat valve, an elaborate cabling can be omitted and a purely temperature-dependent control of the valve devices 14, 26 take place.

Looking at FIG. 2 further it is evident that the condenser 12 with respect to which the coolant cooler 7 is connected in series with respect to an airflow 27, i.e. in the present case in flow direction after the coolant cooler 7. Upstream or downstream of the evaporator 13, a third valve device 28 can be additionally provided in the refrigerant circuit 10, via which a refrigerant flow flowing through the evaporator 13 is controllable. By way of this, the output of the evaporator 13 and thus for example the output of an air conditioning system for a passenger compartment can be controlled. The evaporator 13 can be arranged behind a fan 29 of the air conditioning system. The evaporator 13 can also be a part of an air conditioning system for air conditioning a passenger compartment.

Now looking at the embodiments of the chiller 9 according to FIGS. 3 to 6 it is evident that the first valve device 14, there, is attached directly to the chiller 9, which is possible for example by means of a simple housing and screw connection. In the control piston 18, a wax expansion element 30 can be additionally installed which causes a temperature-dependent moving or adjusting of the control piston 18 and thus a temperature-dependent switching of the first valve device 14. In the embodiments according to FIGS. 3 to 6, the first valve device 14 is thus attached to the chiller 9 while with the embodiment shown according to FIG. 2 it is arranged in the chiller 9.

Figure 6:
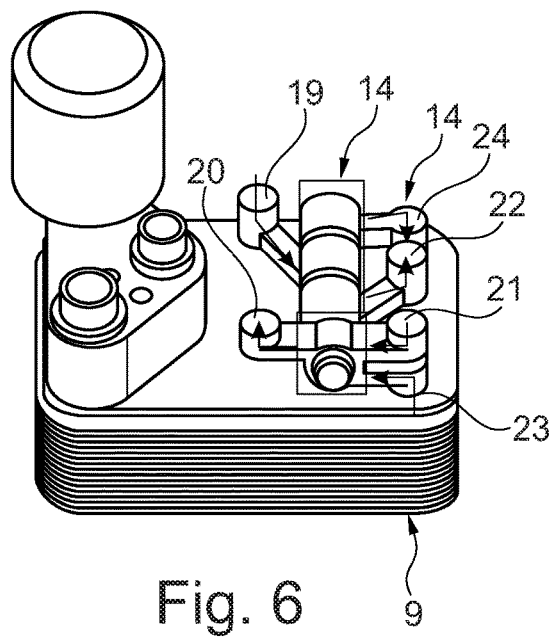
FIG. 6 shows a representation as in FIG. 4, however without housing of the first valve device.
Figure 7:
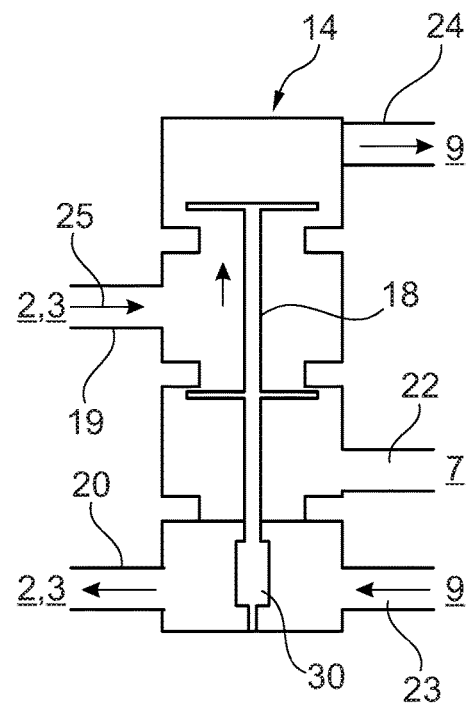
FIG. 7 shows a first valve device according to the invention in a sectional representation with a control piston situated in its second position.
Figure 8:
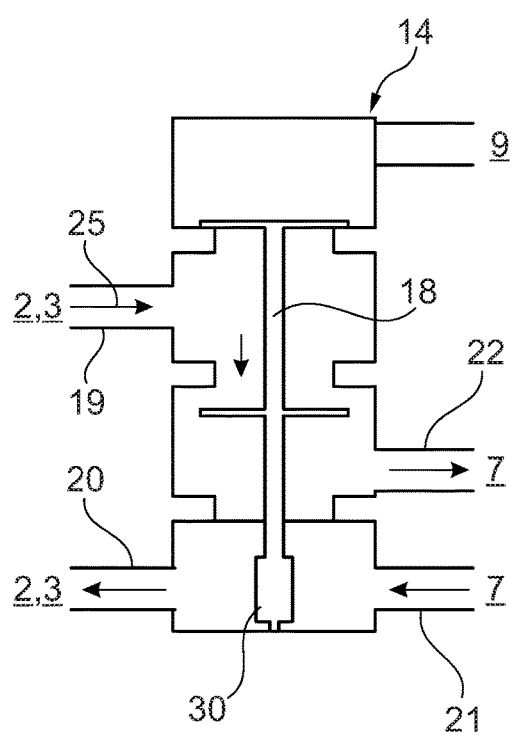
FIG. 8 shows a representation as in FIG. 7, however with a control piston situated in its first position.

The drawings of FIGS. 7 and 8 of the valve device 14 according to the invention are drawn at different heights so that according to FIG. 8 the section plane lies in the region of the coolant cooler side coolant inlet 21, while according to FIG. 7 in conjunction with FIG. 6 it is arranged below that and shows the chiller side coolant inlet 23. It should be noted that the first valve device 14 according to FIGS. 3 to 8 cannot be compared with the valve device 14 according to FIG. 2 since the first valve device 14 there is designed as a simple 3/2-way valve.

With the device 1 according to the invention, a clear reduction of the required installation space can be achieved just as the saving of additional lines and altogether four connecting points 17, as a result of which the assembly and thus also the manufacturing costs can be significantly reduced.

The invention claimed is:

1. A device for temperature-controlling a vehicle battery in an electric or hybrid vehicle, comprising:
   a coolant circuit, in which the vehicle battery, a coolant cooler, a coolant pump, and a chiller are arranged;
   a refrigerant circuit, in which the chiller, a compressor, a condenser, and an evaporator are arranged; and
   a first valve device arranged one of (i) in the chiller and (ii) on the chiller, via which a coolant flow is dividable between the chiller and the coolant cooler;
   wherein the first valve device is structured as a thermostat valve and includes a control piston; and
   wherein the control piston includes an expansion element structured and arranged to adjust a position of the control piston in a temperature-dependent manner.

2. The device according to claim 1, wherein the first valve device includes:
   a first coolant space;
   a second coolant space;
   a battery side coolant inlet in fluid communication with the first coolant space;
   a battery side coolant outlet in fluid communication with the second coolant space;
   a coolant cooler side coolant inlet in fluid communication with the second coolant space;
   a coolant cooler side coolant outlet in fluid communication with the first coolant space;
   a chiller side coolant inlet in fluid communication with the second coolant space; and
   a chiller side coolant outlet in fluid communication with the first coolant space.

3. The device according to claim 1, wherein the first valve device is structured as a 3/2-way valve.

4. The device according to claim 1, wherein the first valve device is adjustable into:
- a first position where the first valve device conducts the coolant flow exclusively via the vehicle battery and the coolant cooler;
- a second position where the first valve device exclusively conducts the coolant flow via the vehicle battery and the chiller; and
- an intermediate position where the first valve device conducts the coolant flow via the vehicle battery and proportionately via the chiller and the coolant cooler.

5. The device according to claim 1, further comprising a second valve device disposed in the refrigerant circuit upstream of the chiller, via which a refrigerant flow flowable through the chiller is controllable.

6. The device according to claim 1, wherein the first valve device is at least one of (i) electrically controllable and (ii) structured as a thermostat valve.

7. The device according to claim 1, wherein the condenser, with respect to an airflow, is arranged downstream of the coolant cooler.

8. The device according to claim 1, further comprising a second valve device disposed in the refrigerant circuit upstream of the evaporator, via which a refrigerant flow flowable through the evaporator is controllable.

9. The device according to claim 1, wherein the first valve device is detachably connected to the chiller via a screw connection.

10. An electric or hybrid vehicle, comprising a vehicle battery, a device for temperature-controlling the vehicle battery, a passenger compartment, and an air conditioning system for air conditioning the passenger compartment, the device including:
- a coolant circuit, in which the vehicle battery, a coolant cooler, a coolant pump, and a chiller are arranged;
- a refrigerant circuit, in which the chiller, a compressor, a condenser, and an evaporator are arranged;
- a first valve device arranged one of (i) in the chiller and (ii) on the chiller, via which a coolant flow is dividable between the chiller and the coolant cooler;
- wherein the evaporator is part of the air conditioning system;
- wherein the first valve device is structured as a thermostat valve and includes a control piston; and
- wherein the control piston includes an expansion element structured and arranged to adjust a position of the control piston in a temperature-dependent manner.

11. The electric or hybrid vehicle according to claim 10, wherein the first valve device includes:
- a battery side coolant inlet;
- a battery side coolant outlet;
- a coolant cooler side coolant inlet;
- a coolant cooler side coolant outlet;
- a chiller side coolant inlet; and
- a chiller side coolant outlet.

12. The electric or hybrid vehicle according to claim 11, wherein the control piston is adjustable into:
- a first position where the first valve device conducts the coolant flow exclusively via the vehicle battery and the coolant cooler;
- a second position where the first valve device exclusively conducts the coolant flow via the vehicle battery and the chiller; and
- an intermediate position where the first valve device conducts the coolant flow via the vehicle battery and proportionately via the chiller and the coolant cooler.

13. A device for temperature-controlling a vehicle battery in an electric or hybrid vehicle, comprising:
- a coolant circuit, in which the vehicle battery, a coolant cooler, a coolant pump, and a chiller are arranged;
- a refrigerant circuit, in which the chiller, a compressor, a condenser, and an evaporator are arranged;
- a first valve device arranged one of (i) in the chiller and (ii) on the chiller, via which a coolant flow is dividable between the chiller and the coolant cooler; and
- wherein the first valve device includes:
- a first coolant space;
- a second coolant space;
- a battery side coolant inlet in fluid communication with the first coolant space;
- a battery side coolant outlet in fluid communication with the second coolant space;
- a coolant cooler side coolant inlet in fluid communication with the second coolant space;
- a coolant cooler side coolant outlet in fluid communication with the first coolant space;
- a chiller side coolant inlet in fluid communication with the second coolant space;
- a chiller side coolant outlet in fluid communication with the first coolant space; and
- a control piston disposed at least partially in the first coolant space.

14. The device according to claim 13, wherein:
- the control piston includes an expansion element disposed within the second coolant space; and
- the expansion element is structured and arranged to adjust a position of the control piston within the first coolant space in a temperature-dependent manner.

15. The device according to claim 14, wherein:
- the coolant cooler side coolant outlet and the chiller side coolant outlet open into the first coolant space on opposite sides of the battery side coolant inlet;
- the coolant cooler side coolant outlet is open and the chiller side coolant outlet is closed when the control piston is disposed in a first position;
- the coolant cooler side coolant outlet is closed and the chiller side coolant outlet is open when the control piston is disposed in a second position; and
- the coolant cooler side coolant outlet and the chiller side coolant outlet are both partially open when the control piston is disposed in an intermediate position.

16. The device according to claim 1, further comprising:
- a second valve device disposed in the refrigerant circuit upstream of the chiller, via which a refrigerant flow flowable through the chiller is controllable; and
- a third valve device disposed in the refrigerant circuit upstream of the evaporator, via which a refrigerant flow flowable through the evaporator is controllable.

17. The device according to claim 1, wherein the first valve device includes a housing having four connecting points, the four connecting points including:
- a battery side coolant inlet projecting from the housing and configured to connect to the vehicle battery;
- a battery side coolant outlet projecting from the housing and configured to connect to the vehicle battery;
- a coolant cooler coolant inlet projecting from the housing and configured to connect to the coolant cooler; and
- a coolant cooler side coolant outlet projecting from the housing and configured to connect to the coolant cooler.

18. The device according to claim 2, wherein:
the control piston is disposed at least partially in the first coolant space;

the coolant cooler side coolant outlet and the chiller side coolant outlet open into the first coolant space on opposite sides of the battery side coolant inlet;

the coolant cooler side coolant outlet is open and the chiller side coolant outlet is closed when the control piston is disposed in a first position;

the coolant cooler side coolant outlet is closed and the chiller side coolant outlet is open when the control piston is disposed in a second position; and the coolant cooler side coolant outlet and the chiller side coolant outlet are both partially open when the control piston is disposed in an intermediate position.

19. The device according to claim 2, wherein:

the coolant cooler side coolant inlet and the chiller side coolant inlet merge into a common duct; and the coolant cooler side coolant inlet and the chiller side coolant inlet are in fluid communication with the second coolant space via the common duct.

\* \* \* \* \*